(12) United States Patent
Chou

(10) Patent No.: US 9,911,263 B2
(45) Date of Patent: Mar. 6, 2018

(54) INPUT DEVICE WITH DYNAMIC DISPLAY FUNCTION

(71) Applicant: Shih-Kang Chou, Taipei (TW)

(72) Inventor: Shih-Kang Chou, Taipei (TW)

(*) Notice: Subject to any disclaimer, the term of this patent is extended or adjusted under 35 U.S.C. 154(b) by 0 days.

(21) Appl. No.: 15/434,151

(22) Filed: Feb. 16, 2017

(65) Prior Publication Data

US 2017/0243426 A1  Aug. 24, 2017

(30) Foreign Application Priority Data

Feb. 19, 2016  (TW) .............................. 105104879 A

(51) Int. Cl.
*B60R 25/00* (2013.01)
*G07C 9/00* (2006.01)
*G06F 3/041* (2006.01)

(52) U.S. Cl.
CPC ......... *G07C 9/00817* (2013.01); *G06F 3/041* (2013.01); *G07C 9/00174* (2013.01); *G07C 9/0069* (2013.01); *G07C 2009/00642* (2013.01)

(58) Field of Classification Search
None
See application file for complete search history.

(56) References Cited

U.S. PATENT DOCUMENTS 4,479,112 A * 10/1984 Hirsch ................ G06Q 20/382
109/2

* cited by examiner

*Primary Examiner* — Adolf Dsouza
(74) *Attorney, Agent, or Firm* — Alan D. Kamrath; Kamrath IP Lawfirm, P.A.

(57) ABSTRACT

An input device with a dynamic display function includes a panel, an interface unit, and a control module, with multiple buttons groups randomly mounted on the panel. Each buttons group has at least one button, and one buttons group has at least two buttons. Every button has a lighting unit placed adjacently and has a symbol marked thereon, and the buttons in the same buttons groups have an identical symbol. The control module is electrically connected with the interface unit and the lighting unit and lights up at least one lighting unit and its corresponding button in every buttons groups. The interface unit transfers a signal from the lit button when the button is triggered. The buttons are randomly lit up by the control module in every operation.

11 Claims, 11 Drawing Sheets

INPUT DEVICE WITH DYNAMIC DISPLAY FUNCTION

BACKGROUND OF THE INVENTION

1. Field of the Invention

The present invention is related to an input device and, especially, to an input device with a dynamic display function.

2. Description of the Prior Art

A lock is an old invention for protecting people's properties and physical safety. A traditional key-lock pair is improved as a key-less electronic lock to prevent a duplicate of a stolen key. A conventional electronic lock has buttons to input a preset password for unlocking. The buttons usually contain ten digital numbers from "0" to "9" being sequentially placed at a fixed position on the electronic lock. Since the buttons are fixed, the lock owner always presses the same buttons when inputting the password. This will lead to fingerprints or marks being left on surfaces of those buttons. Thus, the password of the electronic lock becomes easy to guess by other persons if they try to break into the lock owner's properties. Because certain buttons are always being pressed, it is also hard to prevent the password from being guessed by peeking or being secretly recorded by other persons.

In order to solve the disadvantages of fixed buttons of the conventional electronic lock as described above, a liquid crystal display (LCD) for displaying digital numbers has been utilized. The same digital number will be randomly displayed in a different position on the LCD in every operation. Thus, fingerprints or marks won't be left on the conventional electronic lock. However, the electronic lock with an LCD consumes too much power and needs to be charged or batteries must be changed frequently.

SUMMARY OF THE INVENTION

In order to solve shortcomings of the conventional electronic lock with fixed buttons or an LCD, an input device with a dynamic display function of the present invention is required.

An input device with a dynamic display function comprises a panel, an interface unit and a control module. Multiple buttons groups are included in the panel. Each buttons group has at least one button, and one of the buttons group has at least two buttons. Every button has a symbol marked thereon. The buttons in the same buttons groups have an identical symbol. The buttons from every buttons groups are randomly placed on the panel. Each button has a lighting unit placed adjacently for lighting the button. The control module is electrically connected with the interface unit and the lighting unit. The control module lights up at least one lighting unit and its corresponding button in every buttons groups in every operation. The control module receives a signal from the button being triggered.

According to the above description, the present invention has advantages as follows.

1. Since the buttons are randomly lit up by the control module in every operation, the users may safely input the same password by touching or pressing a different buttons combination to avoid fingerprints being left on the same buttons and prevent peeking or being secretly recorded by other people.

2. The present invention consumes less power than the conventional LCD type electronic lock, because the buttons of the present invention are not necessary or seldom all lit up in every operation. The battery may last much longer in the present invention, so it is not necessary to replace the batteries frequently. The present invention does not utilize an LCD and, thus, size and thickness are decreased in the present invention. This may facilitate the present invention being installed on any kind of application such as an electronic safe, a locker or a door lock.

Other objectives, advantages and novel features of the invention will become more apparent from the following detailed description when taken in conjunction with the accompanying drawings.

DETAILED DESCRIPTION OF THE INVENTION

Figure 1:
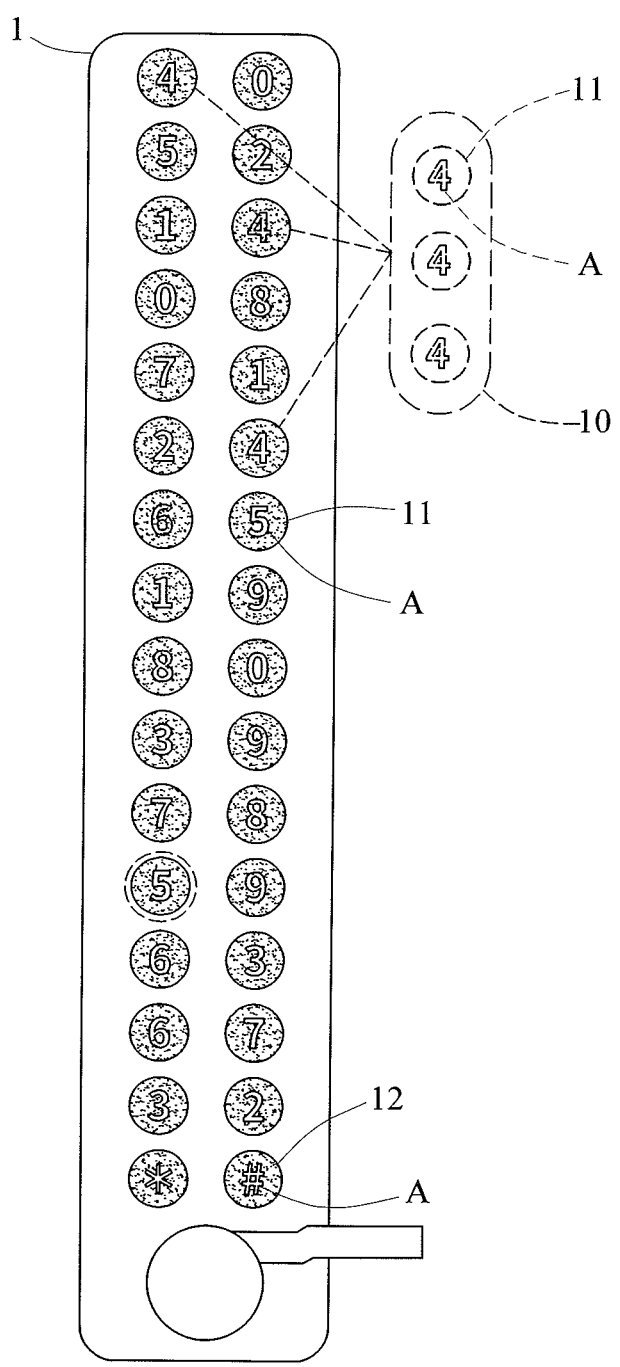
FIG. 1 is an illustration of a first embodiment of an input device with a dynamic display function in accordance with the present invention.
Figure 2:
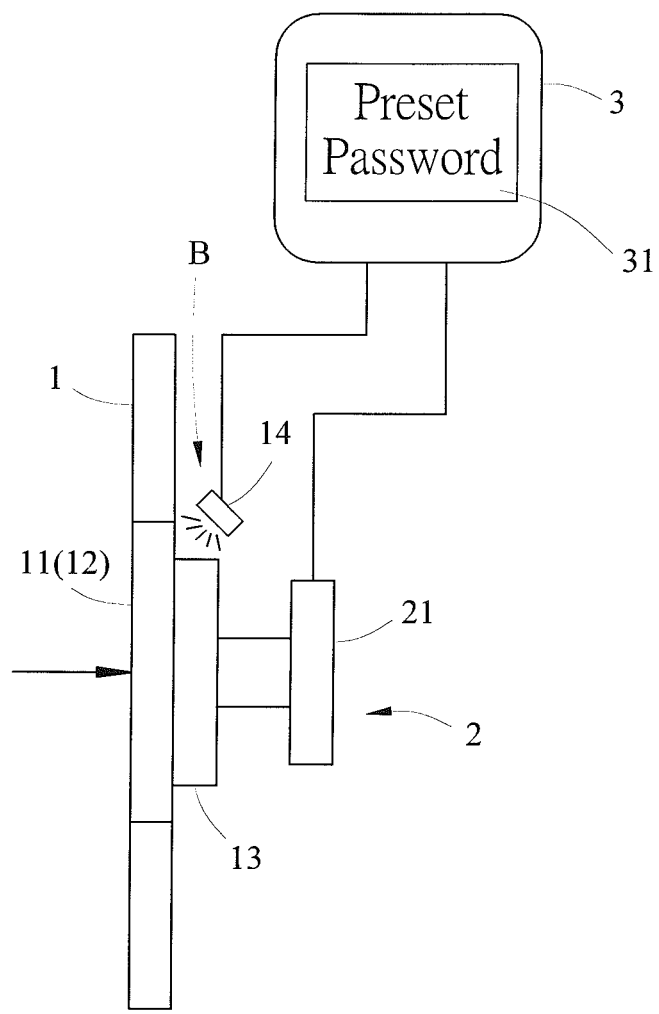
FIG. 2 is an illustration of buttons of the first embodiment in accordance with the present invention.

With reference to FIG. 1 and FIG. 2, an input device with a dynamic display function may be used for an electronic safe, an electronic lock, an automated teller machine (ATM) and the like applications in accordance with the present invention and comprises a panel 1 and a control module 3 electrically connected to the panel 1.

The panel 1 has at least two button groups 10 and may have an interface unit 2. The at least two buttons groups 10 are located on the panel 1. Each buttons group 10 has at least one button 11. The button 11 in the same buttons group 10 has an identical symbol A marked thereon. The button 11 in a different buttons group 10 is marked with different symbol A. The button 11 may be but not limited to an electrical thin film button, a mechanical button or a define area of a touch panel. In a first embodiment of the present invention, ten buttons groups 10 and two special buttons 12 are disclosed. Each buttons group 10 has three buttons 11 marked with the same symbol A. The symbol A of this embodiment are numbers from "0", "1". . . to "9" in different buttons groups 10. The buttons 11 mounted on the panel 1 are all translucent for showing the symbol A properly. The buttons 11 having the same symbol A in the same buttons group 10 are randomly placed on the panel 1. Two special buttons 12 are also translucent and have symbols A of "*" and "#" marked thereon.

With reference to FIG. 2, multiple lighting units B are located behind the panel 1 corresponding to each button 11 and the special buttons 12. Each lighting unit B comprises a light guide 13 and a light-emitting unit 14. The light guide 13 may be a film, a plate or a like element for guiding light. The light-emitting unit 14 can be a light-emitting diode (LED), a bulb or a like element for emitting light. The light guide 13 is respectively placed on back sides of each button 11 and each special button 12. The light-emitting unit 14 is respectively placed adjacent to each light guide 13. Thus, the light-emitting unit 14 provides a light output to enhance brightness of the button 11 and the special button 12 to show the symbols A more clearly. The light-emitting unit 14 of the lighting unit B may also be used directly to light the buttons 11 without using the light guides 13.

Figure 3:
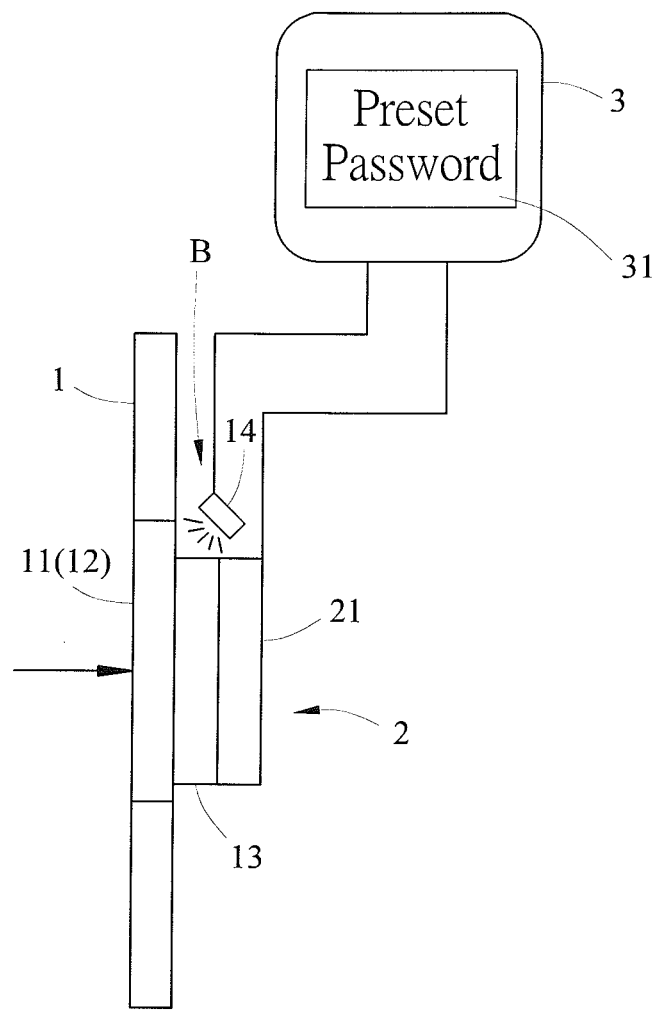
FIG. 3 is an illustration of the second embodiment of the input device with a dynamic display function in accordance with the present invention.

The interface unit 2 transfers signals when the buttons 11 and the two special buttons 12 are touched by users. In this embodiment, the interface unit 2 has multiple touch units 21, and each touch unit 21 is respectively placed on the back side of each button 11 and the two special buttons 12. Thus, each touch units 21 is able to transfer the signal when the buttons 11 or the two special buttons 12 are touched by the users. The touch unit 21 may be but not limited to a switch or a sensor on a printed circuit board (PCB). With reference to FIG. 3, a second embodiment of the present invention is presented. The touch units 21 of the interface unit 2 are sensors on the PCB. The sensors may be proximity sensors or touch sensors placed on the back side of each button 11 and the two special buttons 12. The interface unit 2 may not be necessary in this invention if the buttons 11 and the two special buttons 12 are connected to the control module 3.

Figure 4:
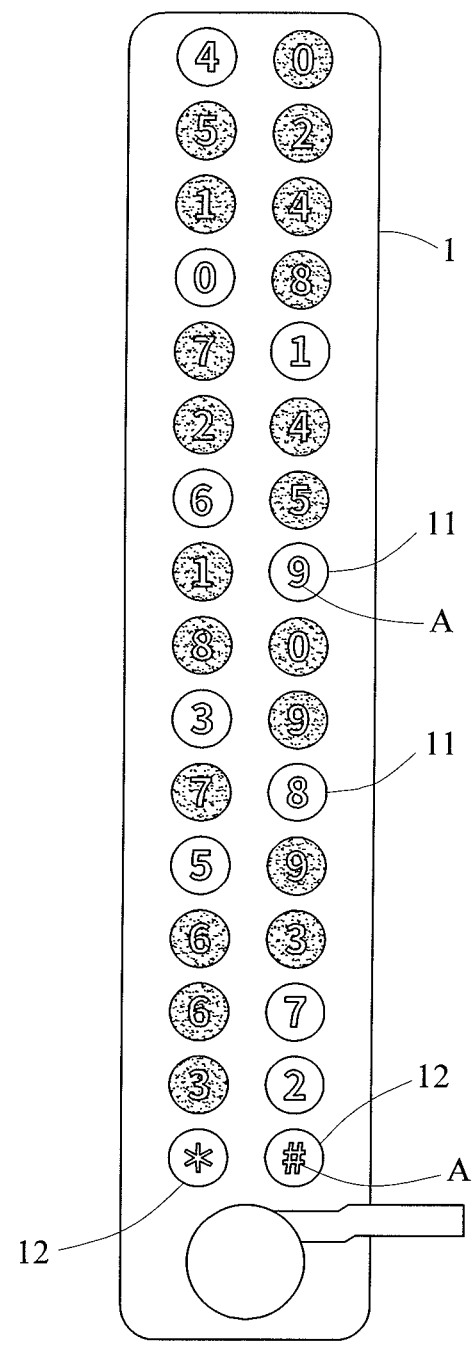
FIG. 4 and FIG. 5 are an operational illustration of the first embodiment in accordance with the present invention.

With reference to FIG. 1, FIG. 3, FIG. 4, and FIG. 5, the control module 3 is electrically connected to the light-emitting unit 14 and the touch unit 21. The control module 3 has a preset password 31 for unlocking. The control module 3 controls each light-emitting unit 14 being lighted or turned off. The control module 3 is able to randomly light up certain buttons 11 and the two special buttons 12 for the users to input a password corresponding to the preset password 31. Remaining buttons 11, which not being lit up by the control module 3, are invalid and unable to transfer the signal even when touched or pressed by the users. FIG. 4 shows only one button 11 in each buttons group 10 marked with symbols A and the two special buttons 12 being lit up. The symbols A marked on each lit button 11 are "0" to "9" in this embodiment. Remaining buttons 11 are not lit up by the control module 3 and are invalid.

Figure 5:
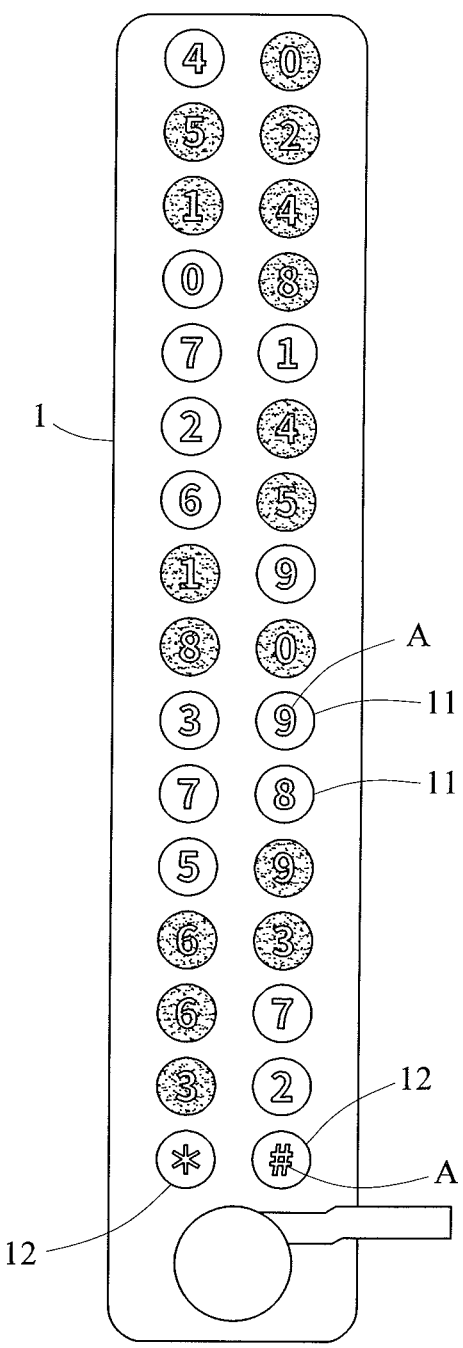

The number of the buttons 11 being lit up by the control module 3 in each buttons group 10 is not limited to only one as abovementioned embodiment. However, at least one button 11 in each buttons group will be lit up by the control module 3 in every operation. With reference to FIG. 5, besides one button 11 in each buttons group with the symbols A of "0" to "9" being lit up, the extra two symbols A of "7", one symbol A of "2" and one symbol A of "9" from different buttons groups 10 are also lit up by the control module 3. In some circumstances, every button 11 in the same buttons group may all be lit up by the control module 3. Thus, users may have more choices to press or touch different buttons 11 with the same symbol A in order to prevent any fingerprint being left on some specific buttons 11 that being regularly touched or pressed.

Figure 6:
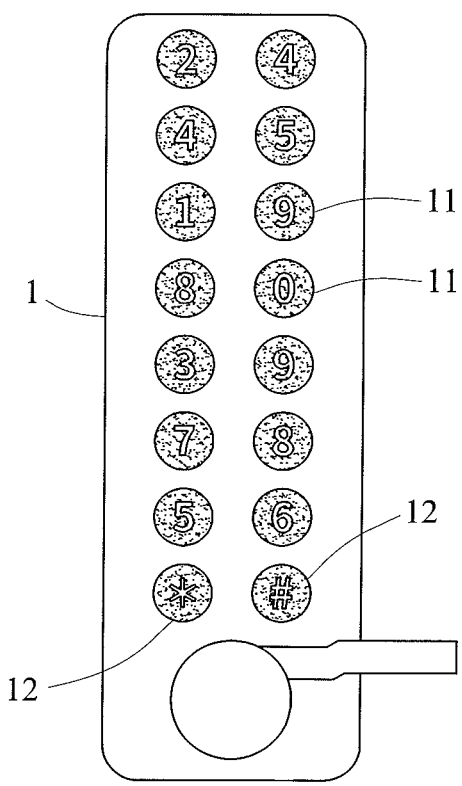
FIG. 6 is an illustration of the third embodiment in accordance with the present invention.

The panel 1 has at least two buttons groups 10 mounted thereon. The numbers of the buttons 11 is at least one in every buttons groups 10, but one of the buttons group 10 has at least two buttons 11. With reference to FIG. 6, a third embodiment of the present invention is presented. The buttons groups 10 having the button 11 marked with symbols A of "0", "1", "2", "3", "6" and "7" only have one button 11 therein. The buttons groups 10 having the button 11 marked with symbols A of "4", "5", "8" and "9" otherwise have two buttons 11 therein. The arrangement of the buttons groups 10 in this embodiment may reduce the numbers of buttons 11 mounted on the panel 1 in order to minimize the size of the panel 1. The control module 3 still can randomly light up one button 11 in different buttons groups 10 marked with symbols A of "0" to "9" and two special buttons 12 for the users to input the password properly.

Since the buttons 11 are randomly lit up by the control module 3 in every operation, the users may safely input the same password by touching or pressing different buttons 11 to avoid any fingerprint being left on the same button 11 and prevent peeking by other people. Furthermore, the present invention consumes less power than the conventional LCD type electronic lock because the buttons 11 of the present invention are not necessary or seldom all lit up in every operation. The battery may last much longer in the present invention to reduce the trouble of replacing batteries frequently. The present invention does not utilize an LCD screen for display which can reduce the size and thickness of the present invention. The present invention is able to be installed on applications such as a door lock system, a locker or the like.

When the user presses or touches the buttons 11 being lit up, the control module 3 receives the signals from the interface unit 2 or directly from the buttons 11 being touched. The control module 3 compares the signals with the preset password 31 and outputs another signal for showing a result of the comparison. The control module 3 will output the result like showing "correct input" if the user has input the password matching the preset password 31, or showing "error input". The result of "correct input" and "error input" may come along with actions of unlocking or keeping locked. The control module 3 may also output a control signal to directly unlock if the user has input the password matching the preset password 31.

Because the buttons 11 are all fixed on the panel 1, the control module 3 may simply be a microprocessor to control all actions of the present invention. The expensive microprocessor or a complicated circuit control is not necessary for the present invention. Thus, the present invention is able to be produced with low cost, also has low power consumption, and is stable in use.

Figure 7:
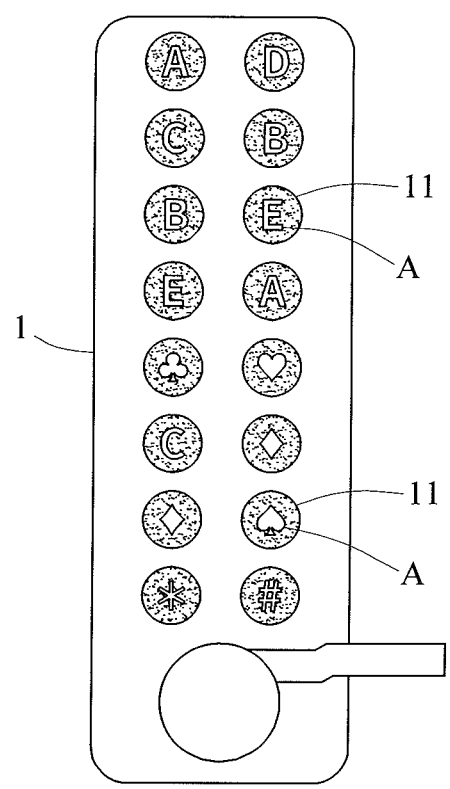
FIG. 7 is an illustration of the fourth embodiment in accordance with the present invention.

The symbols A of the present invention are not limited to be digital numbers as in the abovementioned embodiments. With reference to FIG. 7, a fourth embodiment of the present invention shows that the symbols A marked on the buttons 11 may also be English letters or other patterns.

Figure 8:
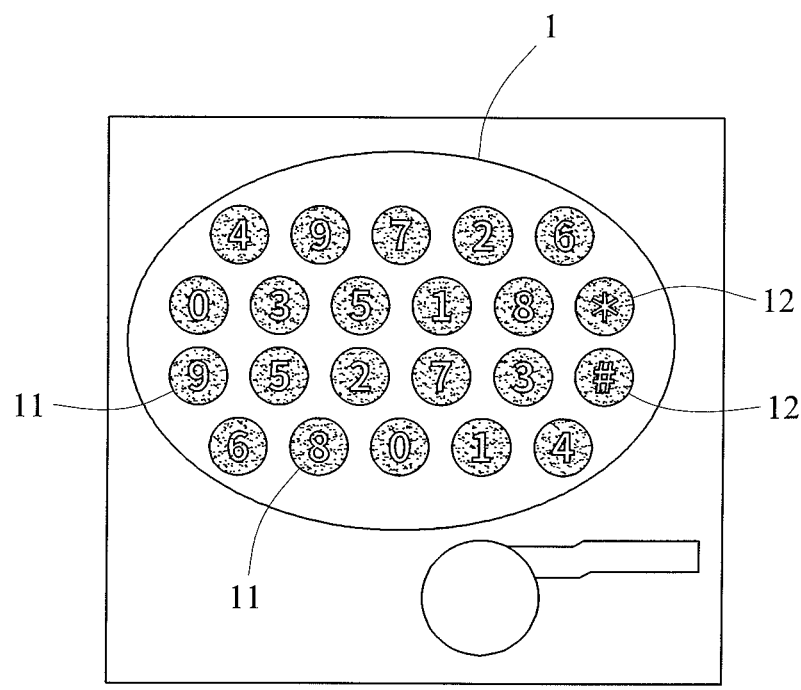
FIG. 8 is an illustration of the fifth embodiment in accordance with the present invention.
Figure 9:
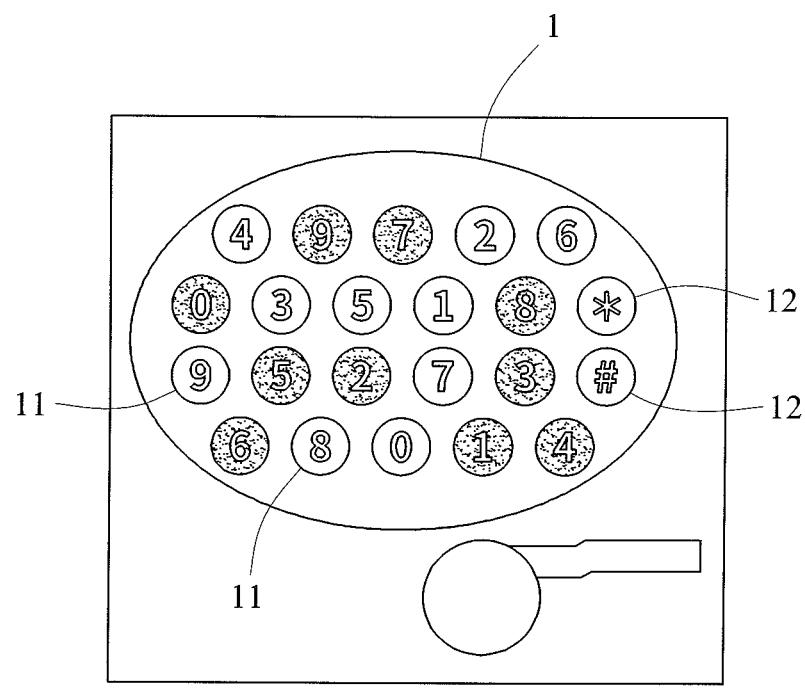
FIG. 9 is an operational illustration of the fifth embodiment in accordance with the present invention.
Figure 10:
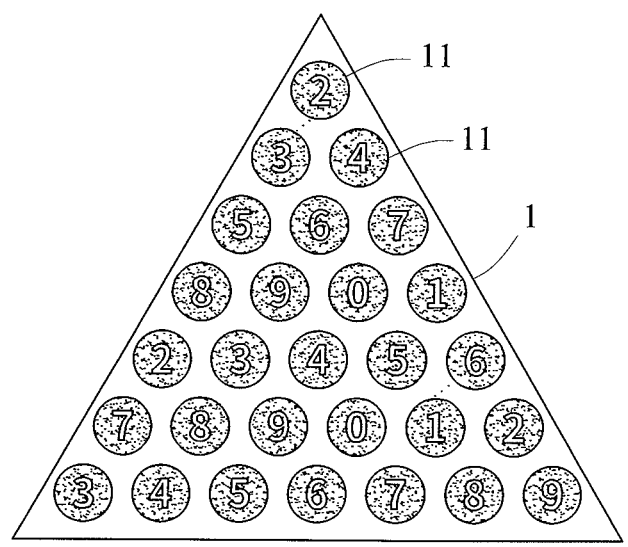
FIG. 10 is an illustration of the sixth embodiment in accordance with the present invention.
Figure 11:
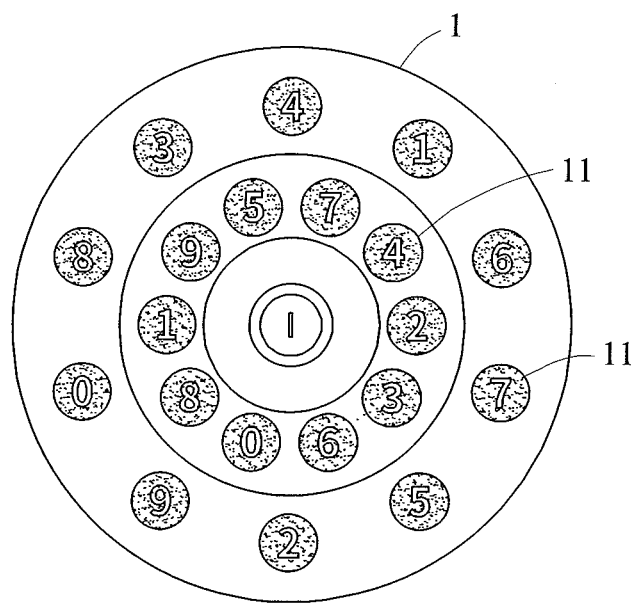
FIG. 11 is an illustration of the seventh embodiment in accordance with the present invention.

With reference to FIG. 1 and FIG. 8 to FIG. 11, the panel 1 of the present invention can be designed in any shape as desired, like a rectangle shape in FIG. 1, an oval shape in FIG. 8 and FIG. 9, a triangle shape in FIG. 10 and a round shape in FIG. 11. The numbers and positions of the buttons 11 may be adjusted with the shape of the panel 1. For example, the fifth embodiment of the present invention in FIG. 8 and FIG. 9 shows twenty buttons 11 and two special buttons 12 being mounted on the panel 1 with an oval shape. These twenty buttons 11 are presented as ten buttons groups 10 marked with symbols A from "0" to "9". Each buttons group 10 has two identical symbols A. FIG. 9 shows that one button 11 in each buttons groups 10 and two special buttons 12 are lit up for pressing or touching.

According to the above description, the present invention has advantages as follows.

1. Since the buttons 11 are randomly lit up by the control module 3 in every operation, the users may safely input the same password by touching or pressing different buttons 11 to avoid any fingerprint being left on the same button 11 and prevent peeking or being secretly recorded by other people.

2. The present invention consumes less power than the conventional LCE type lock because the buttons 11 of the present invention are not necessary or seldom all lit up in every operation. Power may last much longer if using batteries as a power supply for the present invention, so it is not necessary to replace the batteries so frequently. The present invention does not utilize an LCD screen for display which can reduce the size and thickness of the present invention. This may facilitate the present invention being installed on any kind of application such as an electronic safe, a locker or a door lock.

What is claimed is:

1. An input device with dynamic display function comprising a panel, and a control module, wherein:
    multiple buttons groups are located on the panel;
    each buttons group has at least one button;
    one of the buttons group has at least two buttons;
    every button has a symbol marked thereon;
    the buttons of one buttons groups have an identical symbol;
    each button has a lighting unit being placed corresponding to and being used for lighting the button;
    the control module is electrically coupled with the buttons and the lighting unit;
    the control module randomly lights up at least one lighting unit and its corresponding button in every buttons group in every operation;
    the control module receives a signal from the button being triggered; and
    the control module has a preset password for comparing the signal and output another signal for showing a result of the comparison.

2. The input device with dynamic display function as claimed in claim 1, wherein the symbol marked on the button comprises digital numbers, English letters or patterns.

3. The input device with dynamic display function as claimed in claim 1, wherein
    the lighting unit comprises a light guide and a light-emitting unit;
    the light guide is placed on a back side of each button for guiding a light came from the light-emitting unit; and
    the light-emitting unit is electrically connected with the control module.

4. The input device with dynamic display function as claimed in claim 2, wherein
    the lighting unit comprises a light guide and a light-emitting unit;
    the light guide is placed on a back side of each button for guiding a light came from the light-emitting unit; and
    the light-emitting unit is electrically connected with the control module.

5. The input device with dynamic display function as claimed in claim 1, wherein the input device has an interface unit being electronically connected to the control module and the panel, the interface unit transfers the signal to the control module, the interface unit comprises a touch unit placed on a back side of each button, the touch unit is a switch.

6. The input device with dynamic display function as claimed in claim 2, wherein the input device has an interface unit being electronically connected to the control module and the panel, the interface unit transfers the signal to the control module, the interface unit comprises a touch unit placed on a back side of each button, the touch unit is a switch.

7. The input device with dynamic display function as claimed in claim 1, wherein the input device has an interface unit being electronically connected to the control module and the panel, the interface unit transfers the signal to the control module, the interface unit comprises a touch unit placed on a back side of each button, the touch unit is a sensor on a printed circuit board.

8. The input device with dynamic display function as claimed in claim 2, wherein the input device has an interface unit being electronically connected to the control module and the panel, the interface unit transfers the signal to the control module, the interface unit comprises a touch unit placed on a back side of each button, the touch unit is a sensor on a printed circuit board.

9. The input device with dynamic display function as claimed in claim 1, wherein the control module output the signal for unlocking.

10. The input device with dynamic display function as claimed in claim 2, wherein the control module output the signal for unlocking.

11. The input device with dynamic display function as claimed in claim 1, the buttons from every buttons groups being randomly placed on the panel.

\* \* \* \* \*